United States Patent
Wood

(10) Patent No.: US 10,894,606 B2
(45) Date of Patent: Jan. 19, 2021

(54) USE OF INFRARED TRANSPARENT AIRFRAME MATERIALS FOR PASSIVE COOLING OF INTERNAL COMPONENTS

(71) Applicant: Raytheon Company, Waltham, MA (US)

(72) Inventor: Adam Wood, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/845,959

(22) Filed: Dec. 18, 2017

(65) Prior Publication Data
US 2019/0185172 A1    Jun. 20, 2019

(51) Int. Cl.
| | | |
|---|---|---|
| *F01P 3/00* | (2006.01) | |
| *B64D 33/08* | (2006.01) | |
| *B64D 27/16* | (2006.01) | |
| *F02K 7/10* | (2006.01) | |
| *F02K 1/82* | (2006.01) | |
| *F02K 7/14* | (2006.01) | |

(52) U.S. Cl.
CPC ............ *B64D 33/08* (2013.01); *B64D 27/16* (2013.01); *F02K 1/825* (2013.01); *F02K 7/10* (2013.01); *F02K 7/14* (2013.01); *F05D 2220/10* (2013.01); *F05D 2260/221* (2013.01); *F05D 2300/603* (2013.01)

(58) Field of Classification Search
CPC .......... B64D 33/08; B64D 27/16; F02K 7/10; F05D 2220/10; F05D 2260/221; F05D 2300/603; A61N 5/06; B82Y 20/00; H05K 1/181

USPC .......................................................... 165/51
See application file for complete search history.

(56) References Cited

U.S. PATENT DOCUMENTS

| | | | | |
|---|---|---|---|---|
| 4,647,220 A | * | 3/1987 | Adams | G01N 25/72 250/330 |
| 5,413,587 A | * | 5/1995 | Hochstein | A61N 5/06 607/100 |
| 8,445,822 B2 | | 5/2013 | Sunne | |

(Continued)

OTHER PUBLICATIONS

"Technology Today—Highlighting Raytheon's Technology", Raytheon Company, 2012, 64 pages.

*Primary Examiner* — Davis D Hwu

(57) ABSTRACT

Passive reduction of internal jet engine component temperature in supersonic and hypersonic vehicles results from use of nanocomposite optical ceramic materials between the heat-generating portions of each jet engine and the ambient environment, allowing heat dissipation from the jet engine components directly to the ambient environment. A propulsion-airframe integrated scramjet aircraft includes a jet engine and an airframe supporting the jet engine, with at least a portion of the airframe between a heat-generating portion of the jet engine and an ambient environment comprising a nanocomposite optical ceramic material in the form of a panel or a grid of windows each supported within a frame. The nanocomposite optical ceramic material portion of the airframe disposed between the heat-generating portion of the jet engine and the ambient environment is infrared-transparent, and may transmit at least 75% of heat energy from the heat-generating portion of the jet engine to the ambient environment.

23 Claims, 3 Drawing Sheets

(56) References Cited

U.S. PATENT DOCUMENTS

| | | | |
|---|---|---|---|
| 8,806,747 B2 * | 8/2014 | Guinan | B21D 53/02 |
| | | | 219/121.72 |
| 9,012,823 B2 | 4/2015 | Sunne et al. | |
| 2003/0154720 A1 * | 8/2003 | Boehnlein | F02K 7/12 |
| | | | 60/767 |
| 2011/0315808 A1 * | 12/2011 | Zelinski | B82Y 20/00 |
| | | | 244/3.16 |
| 2012/0299175 A1 * | 11/2012 | Tran | B82Y 10/00 |
| | | | 257/712 |
| 2014/0190666 A1 * | 7/2014 | Schlie | F28D 15/0266 |
| | | | 165/104.21 |
| 2018/0288866 A1 * | 10/2018 | Silvano De Sousa | |
| | | | H05K 1/181 |

* cited by examiner

USE OF INFRARED TRANSPARENT AIRFRAME MATERIALS FOR PASSIVE COOLING OF INTERNAL COMPONENTS

TECHNICAL FIELD

The present disclosure is directed in general to cooling of high temperature engine components in hypersonic and other vehicles and more particularly to infrared transparent materials adjacent heat generating components in such hypersonic and other vehicles.

BACKGROUND OF THE DISCLOSURE

For hypersonic vehicles, high speed air flow, electronic components and combustion cause high levels of heating and high temperatures on various components including engine components, ultimately restricting flight capabilities based on material limitations driven by temperature.

SUMMARY OF THE DISCLOSURE

A propulsion-airframe integrated aircraft includes a heat-generating engine and an airframe supporting the engine, with at least a portion of the airframe between a heat-generating portion of the engine and an ambient environment comprising a nanocomposite optical ceramic material. The nanocomposite optical ceramic material portion of the airframe disposed between the heat-generating portion of the engine and the ambient environment is infrared-transparent, and may transmit at least 75% of heat from the heat-generating portion of the engine to the ambient environment. The nanocomposite optical ceramic material portion of the airframe may be one of a panel and a window within a grid of nanocomposite optical ceramic material windows each supported within a frame. One or more portions of the airframe between heat-generating portions of the engine and the ambient environment need be formed of the nanocomposite optical ceramic material, with a remainder of the airframe may comprise a different, infrared-opaque material.

The heat-generating source may be a jet engine including a scramjet engine, a heat generating portion of the engine, a surface of the aircraft heated by friction with air, and/or electronic or other components which generate heat when operated. The aircraft can be a hypersonic, supersonic or subsonic aircraft including a missile. The aircraft may also be a portion attached to the aircraft such as a pod carrying electronics or other heat generating equipment.

A portion of the engine may be an isolator or a combustor, within a scramjet engine including an inlet, the isolator in which a shock train is contained, the combustor, and a nozzle. The engine is one of a plurality of engines within the propulsion-airframe integrated scramjet aircraft, with a portion of the airframe between the heat-generating portions of each engine and the ambient environment comprising nanocomposite optical ceramic material. The passive reduction of internal engine component temperature in supersonic and hypersonic vehicles resulting from use of nanocomposite optical ceramic materials between the heat-generating portions of each engine and the ambient environment, and resulting heat dissipation from the engine components directly to the ambient environment, can increase peak Mach capability and/or reduce mass, while also cooling of internal electronics for lower speed persistence applications.

Although specific advantages have been enumerated above, various embodiments may include some, none, or all of the enumerated advantages. Additionally, other technical advantages may become readily apparent to one of ordinary skill in the art after review of the following figures and description. Although shown as an unmanned vehicle, this may be a manned vehicle, a commercial vehicle or a portion of a manned or commercial vehicle.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
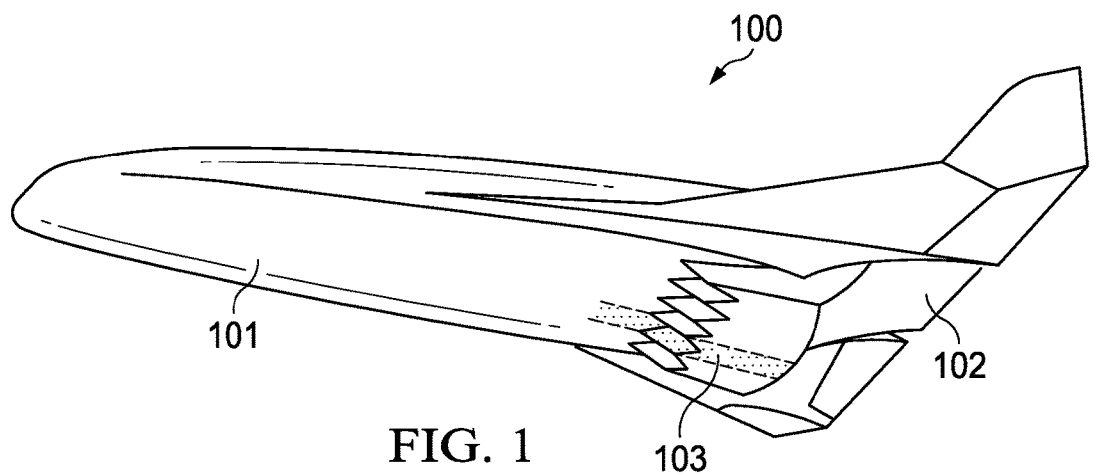
FIG. 1 is a diagram illustrating a hypersonic vehicle employing infrared-transparent airframe materials for passive cooling of internal components in accordance with embodiments of the present disclosure.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

Aircraft flight capability is restricted by material limitations and, for hypersonic vehicles, is at least partially driven by temperature. Flight speeds are limited to reduce aerodynamic heating of the engine flow path, but this reduces performance of the system. Reducing temperatures on hardware increases capability. Engine components are cooled using liquid fuel that passes through cooling channels, providing benefits from preheating the fuel before combustion, but the limited cooling capability of the fuel still imposes limitations on engine hardware peak temperatures. Active cooling using a reservoir, such as the fuel, has limited time capacity because the reservoir depletes over time. In addition, the cooling fluid also has limited heat absorbing capability before hitting a temperature limit, so often not all of the flow path and engine can be cooled. Active cooling also increases design complexity and mass. Sometimes, portions of the engine are allowed to radiate heat to portions of the airframe because the airframe is cooler. This approach does cool the engine, but given the high temperatures on the airframe for supersonic/hypersonic vehicles, cooling remains limited. In the present disclosure, passive radiation cooling is used to reject heat from the internal components into the ambient environment.

FIG. 1 is a diagram illustrating a hypersonic vehicle employing infrared-transparent airframe materials for passive cooling of internal components in accordance with embodiments of the present disclosure. A propulsion-airframe integrated supersonic combusting ramjet (scramjet) 100 is depicted. The scramjet 100 has a body including a fore-body 101 and an aft-body 102, where incoming air flow into the jet engine is forcefully compressed (ramjet) as a result of high vehicle speed in the region of the fore-body 101 and exhaust expansion occurs in the region of the aft-body 102. Rather than decelerate the air flow to subsonic speeds prior to combustion within the engine, the air flow remains at supersonic speeds through the entire engine, allowing efficient operation at extremely high speeds. A cross-section of a single air flow channel 103 on the scramjet 100 is shown enlarged in FIG. 1A. With the vehicle traveling at between Mach 4 and Mach 15 (and air "flowing" around the vehicle and through the vehicle's jet engines at like speeds), the high-speed characteristics of air prevent the air upstream of the jet engine inlet from moving out of the way quickly enough, resulting in air being "rammed" into the inlet 104 for the engine intake in the direction of the arrow labeled "Drag." This creates regions 105 of vehicle bow shock in front of the inlet 104, and shock boundary interactions occur in a region 106 inside the inlet 104. Air then passes into an isolator 107 having an isolator shock train 108. Within the inlet 104 and the isolator 107, air flow slows, but remains at supersonic speeds. Fuel injection stages 109 within the combustor 110 inject fuel into the airflow for combustion, resulting in acceleration of the air to a higher Mach number through the nozzle 111 and producing thrust in the direction of the arrow with that label.

Figure 1A:
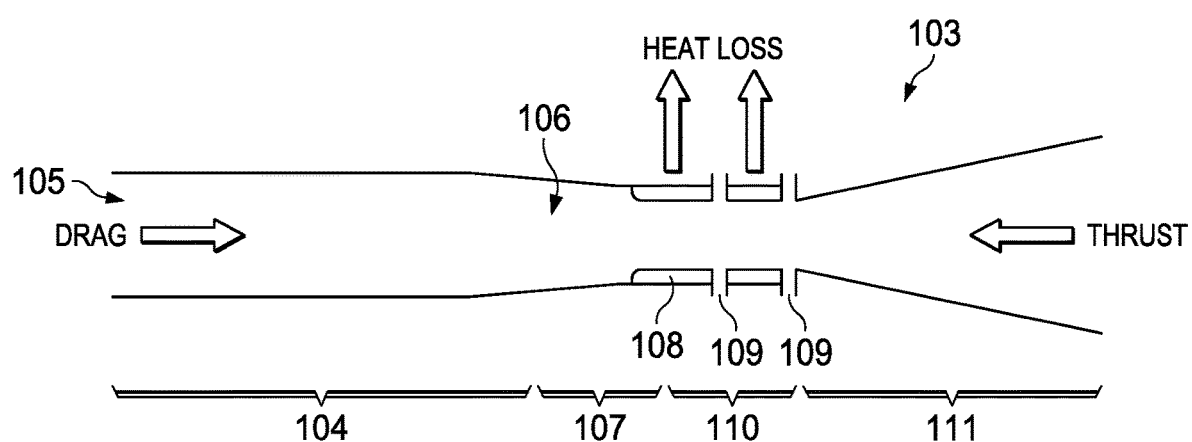
FIG. 1A schematically illustrates heat-generating components within the hypersonic vehicle of FIG. 1.

Within designs of the type illustrated in FIGS. 1 and 1A, the vehicle body comprises an airframe supporting a plurality of jet engines as shown. The airframe materials surrounding the jet engines are typically infrared-opaque, such that heat is first transferred to the airframe itself (or to other internal components) before being radiated into the ambient environment. While radiating heat from the engine to the airframe does somewhat cool the engine, the airframe itself is also very hot from aeroheating, so the cooling capability of the airframe is limited. In the present disclosure, passive radiation cooling is to reject heat for internal components directly to the ambient environment via infrared-transparent airframe materials.

As used herein, the term "infrared-transparent" means substantially optically transparent over a portion of the visible and/or infrared band including one or more of the near IR ("NIR," wavelengths of about 0.75 to about 1.4 microns), the short-wavelength IR ("SWIR," wavelengths of about 1.4 to about 3 microns), the mid-wavelength IR ("MWIR," wavelengths of about 3 to about 8.5 microns), the long-wavelength IR ("LWIR," wavelengths of about 8 to about 12 microns), and/or the visible bands (wavelengths of about 0.4 to about 0.75 microns). For example, mixtures of yttria (e.g., yttrium oxide, $Y_2O_3$) and magnesia (e.g., magnesium oxide, MgO) transmit infrared wavelengths from about 1.5 to about 8.5 microns. Such materials have an average MWIR optical absorption coefficient of less than 0.2 per centimeter ($cm^{-1}$) and total integrated scatter of less than 0.3% with high characteristic fracture strength. The infrared-transparent materials employed preferably transmit in excess of 75% of heat and/or infrared (IR) light. Suitable infrared-transparent nanocomposite optical ceramic (NCOC) materials are disclosed in U.S. Pat. Nos. 8,445,822 and 9,012,823 and U.S. Patent Application Publication No. 2011/0315808, each of which is incorporated herein by reference.

Figure 2:
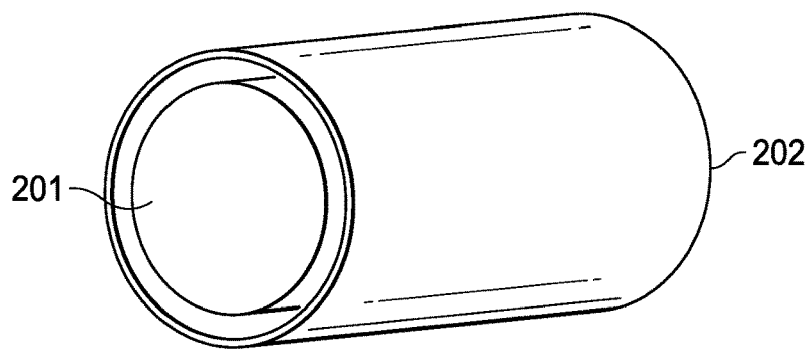
FIGS. 2, 2A and 2B each schematically illustrate the structure and/or placement of infrared-transparent airframe materials for passive cooling of internal components in accordance with embodiments of the present disclosure.
Figure 2A:
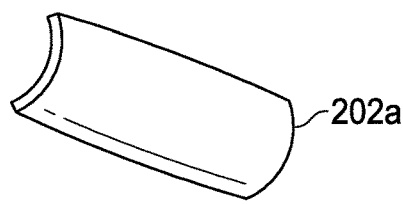
Figure 2B:
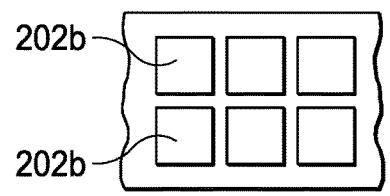

FIG. 2 schematically illustrates placement of infrared-transparent airframe materials for passive cooling of internal components in accordance with embodiments of the present disclosure. Hot internal hardware or components 201 are surrounded, fully or partially, by infrared-transparent airframe material(s) 202. Infrared-transparent materials are used to create windows in the airframe to allow hot engine components to radiate heat directly to the ambient environment. The engine components need not be fully surrounded by infrared-transparent material(s) 202 as shown in FIG. 2. Instead, only those portions of the scramjet airframe separating the hot internal components such as the engine from the ambient environment need include or contain infrared-transparent material(s) 200. For example, in FIG. 1 only the visible portion of the airframe surrounding air flow channel 103 need contain infrared-transparent material(s) 202. In one implementation of such an embodiment, the infrared-transparent material(s) may be formed as a curved panel 202a as shown in FIG. 2A, where the curved panel forms an outer, lower wall of the air flow channel 103. In addition, it is not critical that large panels of infrared-transparent materials be used. Instead, a grid of smaller panes 202b of the infrared-transparent material(s) mounted within a structural frame of conventional airframe materials as shown in FIG. 2B (i.e., "windows" for infrared wavelengths) could be used to improve heat dissipation while maintaining airframe integrity. Localized windows may be strategically placed to help cool specific engine components like the isolator 107 in a scramjet.

Nanocomposite optical ceramics are infrared-transparent materials that have temperature capabilities of over 1100° C. (2000° F.) without melting or deforming, making them suitable for hypersonic vehicles. Over 70% of thermal radiation from an engine operating at or above the 700° C. (1300° F.) range passed directly through windows made of nanocomposite optical ceramics.

Figure 3:
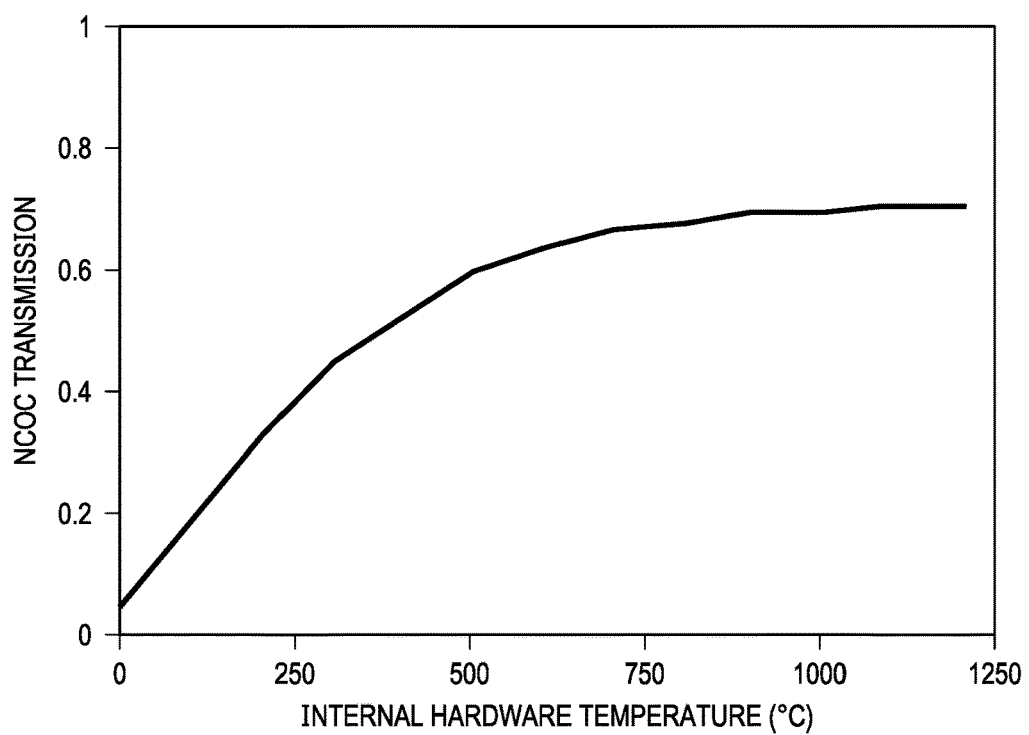
FIG. 3 is a calculated plot of normalized transmission, as a function of temperature, by nanocomposite optical ceramics used as infrared-transparent airframe materials for passive cooling of internal components in accordance with embodiments of the present disclosure.

FIG. 3 is a calculated plot of normalized transmission by nanocomposite optical ceramics as a function of temperature, in ° C., of internal hardware components. Transmission reaches 60% (0.6) at or near 500° C., and closely approaches 80% (0.8) as temperature further increases.

Figure 4A:
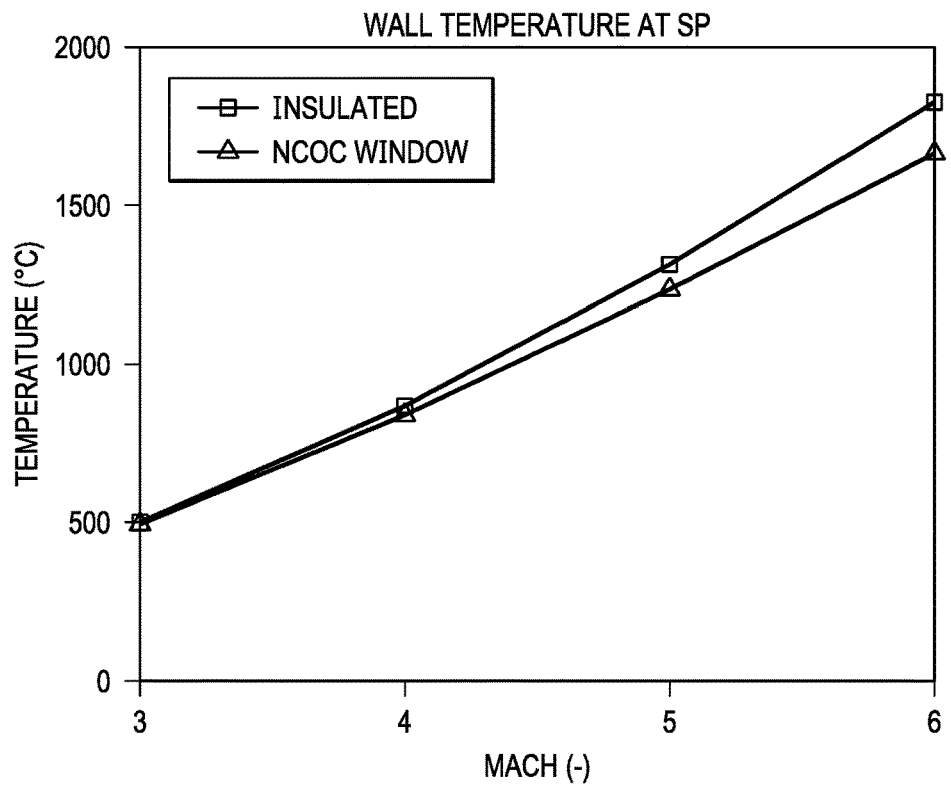
FIGS. 4A and 4B are comparative calculated plots for (sc)ramjet isolator wall temperature for a range of speeds with and without infrared-transparent airframe materials for passive cooling of internal components in accordance with embodiments of the present disclosure.
Figure 4B:
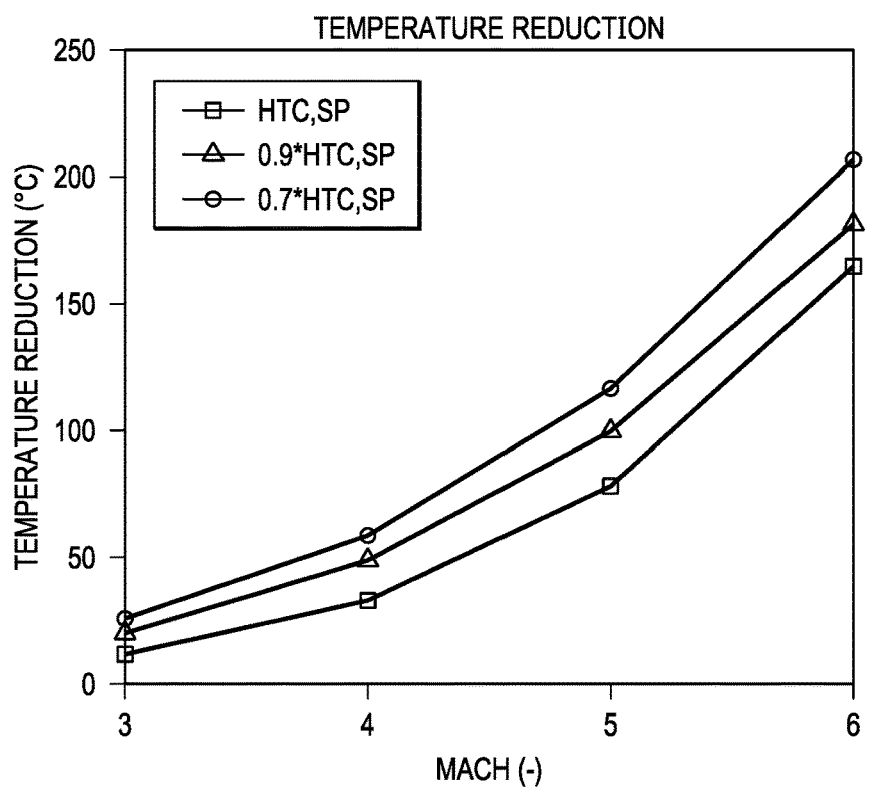

FIGS. 4A and 4B are comparative calculated plots for (sc)ramjet isolator wall temperature for a range of speeds with and without infrared-transparent airframe materials for passive cooling of internal components in accordance with embodiments of the present disclosure. Hardware wall temperatures reach an equilibrium between aeroheating and radiation. The smallest benefit will be seen when aeroheating is highest, so heating at a stagnation point (SP) was calculated, but benefits increase as aeroheating drops.

In FIG. 4A, wall temperature in ° C. as a function of speeds between Mach 3 and Mach 6 are plotted, for a conventional insulated isolator (square data points, top trace) and for a nanocomposite optical ceramics window (triangular data points, bottom trace). An 80° C. (144° F.) reduction in wall temperature at the stagnation point for a speed of Mach 5 at the ambient temperature for 50,000 feet provides similar benefits to a fuel-cooled radiator. In FIG. 4B, isolator temperature reduction in ° C. as a function of speeds between Mach 3 and Mach 6 are plotted for different levels of heat transfer relative to the heat transfer coefficient (respectively: square data points, bottom trace; triangular data points, middle trace; and circular data points, top trace).

Passive reduction of internal engine component temperature in high speed (supersonic and hypersonic) vehicles can either or both of increase peak Mach capability and/or reduce mass, while also cooling of internal electronics for lower speed persistence missions. In commercial applications, the potential for reduction/elimination of the need for fuel cooling of engines or other cooling of internal electronics for lower speed vehicles may be achieved.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The description in the present application should not be read as implying that any particular element, step, or function is an essential or critical element which must be included in the claim scope: the scope of patented subject matter is defined only by the allowed claims. Moreover, none of these claims are intended to invoke 35 USC § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

What is claimed is:

1. An apparatus, comprising:
a heat source; and
an airframe supporting the heat source, at least a portion of the airframe between a heat-generating portion of the heat source and an ambient environment comprising an infrared-transparent material;
wherein the heat source comprises a scramjet engine component; and
wherein the portion of the airframe is configured to transmit a majority of heat from the heat source impinging on the infrared-transparent material.

2. The apparatus according to claim 1, wherein the portion of the airframe between the heat-generating portion of the heat source and the ambient environment is configured to transmit at least 75% of heat energy from the heat-generating portion of the heat source to the ambient environment.

3. The apparatus according to claim 1, wherein the portion of the airframe between the heat-generating portion of the heat source and the ambient environment comprises a panel.

4. The apparatus according to claim 1, wherein the heat-generating portion of the heat source is an isolator.

5. The apparatus according to claim 1, wherein the heat-generating portion of the heat source is a combustor.

6. A propulsion-airframe integrated scramjet aircraft comprising the apparatus according to claim 1, the propulsion-airframe integrated scramjet aircraft further comprising:
a plurality of heat sources including the heat source; and
a vehicle body comprising the airframe.

7. The apparatus according to claim 1, wherein the airframe forms part of a flight vehicle.

8. The apparatus according to claim 1, wherein the infrared-transparent material comprises a nanocomposite optical ceramic material.

9. An apparatus, comprising:
a heat source; and
an airframe supporting the heat source, at least a portion of the airframe between a heat-generating portion of the heat source and an ambient environment comprising a nanocomposite optical ceramic material;
wherein the portion of the airframe between the heat-generating portion of the heat source and the ambient environment comprises a window within a grid of nanocomposite optical ceramic material windows each supported within a frame.

10. The apparatus according to claim 9, wherein the heat source is a scramjet engine component.

11. An apparatus, comprising:
a heat source; and
an airframe supporting the heat source, at least a portion of the airframe between a heat-generating portion of the heat source and an ambient environment comprising one of:
a nanocomposite optical ceramic material; or
an infrared-transmissive material configured to transmit a majority of heat from the heat source impinging on the infrared-transmissive material;
wherein:
the heat source comprises an inlet, an isolator containing an isolator shock train, a combustor, and a nozzle; and
the portion of the airframe between the heat-generating portion of the heat source and the ambient environment is located between the ambient environment and at least one of the isolator and the combustor.

12. The apparatus according to claim 9, wherein the portion of the airframe between the heat-generating portion of the heat source and the ambient environment is infrared-transparent.

13. A method of dissipating heat in a propulsion-airframe integrated scramjet aircraft, the method comprising:
supporting a scramjet engine with an airframe; and
providing, within at least a portion of the airframe between a heat-generating portion of the scramjet engine and an ambient environment, an infrared-transparent material;
wherein the portion of the airframe is configured to transmit a majority of heat from the scramjet engine impinging on the infrared-transparent material.

14. The method according to claim 13, wherein the portion of the airframe between the heat-generating portion of the scramjet engine and the ambient environment is configured to transmit at least 75% of heat energy from the heat-generating portion of the scramjet engine to the ambient environment.

15. The method according to claim 13, wherein the portion of the airframe between the heat-generating portion of the scramjet engine and the ambient environment comprises a panel.

16. The method according to claim 13, wherein the heat-generating portion of the scramjet engine is an isolator.

17. The method according to claim 13, wherein the heat-generating portion of the scramjet engine is a combustor.

18. A method of dissipating heat in a propulsion-airframe integrated scramjet aircraft, the method comprising:
supporting a scramjet engine with an airframe; and
providing, within at least a portion of the airframe between a heat-generating portion of the scramjet engine and an ambient environment, a nanocomposite optical ceramic material;
wherein the portion of the airframe between the heat-generating portion of the scramjet engine and the ambient environment comprises a window within a grid of nanocomposite optical ceramic material windows each supported within a frame.

19. A method of dissipating heat in a propulsion-airframe integrated scramjet aircraft, the method comprising:
supporting a scramjet engine with an airframe; and
providing, within at least a portion of the airframe between a heat-generating portion of the scramjet engine and an ambient environment, a nanocomposite optical ceramic material;
wherein an enclosure for the scramjet engine comprises a second material supporting the nanocomposite optical ceramic material.

20. A method of dissipating heat in a propulsion-airframe integrated scramjet aircraft, the method comprising:
supporting a scramjet engine with an airframe; and
providing, within at least a portion of the airframe between a heat-generating portion of the scramjet engine and an ambient environment, one of:
a nanocomposite optical ceramic material; or
an infrared-transmissive material configured to transmit a majority of heat from the scramjet engine impinging on the infrared-transmissive material;
wherein:
the scramjet engine comprises an inlet, an isolator containing an isolator shock train, a combustor, and a nozzle; and
the portion of the airframe between the heat-generating portion of the scramjet engine and the ambient environment is located between the ambient environment and at least one of the isolator and the combustor.

21. The method according to claim 20, wherein the portion of the airframe between the heat-generating portion of the scramjet engine and the ambient environment is infrared-transparent.

22. A method of dissipating heat in a propulsion-airframe integrated scramjet aircraft, the method comprising:
supporting a plurality of scramjet engines of the propulsion-airframe integrated scramjet aircraft with a vehicle body of the propulsion-airframe integrated scramjet aircraft, the vehicle body comprising an airframe; and
providing, within at least a portion of the airframe between a heat-generating portion of at least one of the scramjet engines and an ambient environment, one of:
a nanocomposite optical ceramic material; or
an infrared-transparent material configured to transmit a majority of heat from at least one of the scramjet engines impinging on the infrared-transparent material.

23. The method according to claim 13, wherein the infrared-transparent material comprises a nanocomposite optical ceramic material.

* * * * *